United States Patent
Gaw et al.

(10) Patent No.: US 8,465,241 B2
(45) Date of Patent: Jun. 18, 2013

(54) COMPOSITE FASTENERS CONTAINING MULTIPLE REINFORCING FIBER TYPES

(75) Inventors: Kevin O. Gaw, St. Tukwila, WA (US); Randall A. Rogers, Auburn, WA (US)

(73) Assignee: The Boeing Company, Chicago, IL (US)

( * ) Notice: Subject to any disclaimer, the term of this patent is extended or adjusted under 35 U.S.C. 154(b) by 621 days.

(21) Appl. No.: 11/932,186

(22) Filed: Oct. 31, 2007

(65) Prior Publication Data

US 2009/0110901 A1    Apr. 30, 2009

(51) Int. Cl.
*F16B 35/00* (2006.01)
(52) U.S. Cl.
USPC .......................................... 411/424; 411/908
(58) Field of Classification Search
USPC .................... 411/424, 900, 901, 908
See application file for complete search history.

(56) References Cited

U.S. PATENT DOCUMENTS

| | | | | |
|---|---|---|---|---|
| 2,949,054 A | * | 8/1960 | White | 411/418 |
| 4,414,011 A | * | 11/1983 | Layden et al. | 65/442 |
| 5,057,257 A | * | 10/1991 | Neitzke | 264/138 |
| 5,152,650 A | * | 10/1992 | Kitagawa | 411/82.5 |
| 5,209,888 A | * | 5/1993 | Shimada et al. | 264/250 |
| 5,292,215 A | * | 3/1994 | Roberts, III | 411/424 |
| 5,567,374 A | * | 10/1996 | Thicthener et al. | 264/137 |

\* cited by examiner

*Primary Examiner* — Flemming Saether
(74) *Attorney, Agent, or Firm* — Haynes and Boone, LLP

(57) ABSTRACT

A method for making composite fasteners includes the provision of a mold containing an elongated cavity having a long axis and the shape of the fastener body, an elongated insert comprising a plurality of long, interwoven or intermingled first reinforcing fibers, and a hardenable liquid matrix that may include a plurality of short, second reinforcing fibers suspended therein. The insert is placed in the cavity such that the long reinforcing fibers are disposed generally parallel to the long axis of the cavity. The mold cavity is then filled with the liquid matrix such that the short reinforcing fibers are distributed generally uniformly throughout the mold cavity, and the liquid matrix of the suspension is then hardened so as to form a hardened fastener body encapsulating the first and second reinforcing fibers. The molded fastener is then removed from the mold, either for immediate use or for subsequent processing.

23 Claims, 3 Drawing Sheets

COMPOSITE FASTENERS CONTAINING MULTIPLE REINFORCING FIBER TYPES

BACKGROUND

This disclosure relates to fasteners, such as screws and bolts, in general, and in particular, to composite fasteners that comprise two or more materials, including more than one type of reinforcing fiber, as well as methods for manufacturing such fasteners.

Conventional fasteners include high-strength but relatively heavy metallic fasteners, such as conventional threaded screws and bolts made of a variety of high-strength metals and alloys amenable to heat treatment, and relatively light but low-strength polymeric fasteners. The problem with the former is that they result in a high-density "overdesign," whereas, the latter lack sufficient strength to be useful in applications requiring relatively high-strength, low creep fasteners, e.g., the airframes of modern jetliners, including aircraft having composite components.

Accordingly, there is a long felt but as yet unsatisfied need in the aircraft industry for fasteners that combine the high-strength advantage of metallic fasteners with the low weight advantage of polymer based composite fasteners, and methods for manufacturing them reliably and inexpensively. Such fasteners would provide for the low-mass fastening of two different substrates, and afford a substantial reduction in the weight of the resulting structures, e.g., aircraft structures.

SUMMARY

In accordance with the several exemplary embodiments thereof disclosed herein, composite fasteners containing multiple types of reinforcing fibers are provided, as well as methods for making them, that result in the formation of polymeric composite fasteners that are light weight, have tailored electrical conductivity, and are corrosion resistant.

In one exemplary embodiment, a method for manufacturing composite fasteners comprises providing a mold containing an elongated cavity having a long axis and the shape of a corresponding fastener, an elongated insert comprising a plurality of intermingled/interwoven first reinforcing fibers having a length about the same as that of the cavity, and a liquid suspension comprising a polymerizable liquid matrix in which a plurality of second reinforcing fibers are suspended, the second reinforcing fibers having a length substantially less than the length of the first reinforcing fibers. The mold is opened and the insert is placed in the cavity such that the first reinforcing fibers are disposed generally parallel to the long axis of the cavity. The mold is then closed, and the cavity of the mold is then filled with the polymer, which may comprise a suspension of shorter fibers, such that the relatively short second reinforcing fibers are distributed generally uniformly throughout the cavity, including into the interstices of the reinforcing fibrous insert. The liquid matrix of the suspension in the mold is then polymerized so as to form a hardened fastener body encapsulating the first and second reinforcing fibers. When the polymerization or hardening of the suspension matrix is complete, the mold is opened and the molded fastener is removed from the mold.

In another exemplary embodiment, a composite fastener comprises: A molded polymer body, including an elongated shank portion and a radially enlarged head portion disposed concentrically at one end of the shank portion; an elongated insert encapsulated within the fastener body, the insert comprising a plurality of interwoven and/or intermingled first reinforcing fibers having a length about as long as the fastener body and extending between opposite ends thereof; and, a plurality of second reinforcing fibers encapsulated with the fastener body, the second reinforcing fibers having a length substantially less than the length of the first reinforcing fibers and being distributed generally uniformly throughout the fastener body.

A better understanding of the above and many other features and advantages of the novel composite fasteners of the present invention can be obtained from a consideration of the detailed description of some exemplary embodiments thereof below, particularly, if such consideration is made in conjunction with the appended drawings, wherein like reference numbers are used to refer to like elements in the various figures thereof.

DETAILED DESCRIPTION

In accordance with the present disclosure, infiltration of a low-viscosity matrix-forming material (such as a thermosetting epoxy resin) into a fibrous pre-form or insert disposed in the cavity of a suitable mold enables the proper placement and orientation of reinforcing fibers encapsulated in a finished, molded fastener body. The cycle time (i.e., total time for formation) for thermosetting resin containing mixtures, is relatively short, as there can be little need to rigorously control process parameters, such as polymer melt temperature or mold temperature. In the case where a two part thermosetting resin mixture is used, a mixing of the liquid components may be part of the injection process so as to require a relatively more precise control of stoichiometries or flow regimes.

The incorporation of two or more different matrix materials and reinforcing fibers within the same fastener enables: Variance of fiber concentration, variance in conductivity along the length of the fastener, the transfer of load from highly loaded surfaces (such as the threaded region) to less directly loaded fibers (such as in the shank of the fastener) and across relatively short distances (e.g., the radius of the fastener shank). Co-molding and proper choice of volume percentage of two different fibrous materials in a polymeric matrix (i.e., fibers of different composition or physical attributes, such as conductive or non-conductive fibers, or fibers with different lengths and/or length/diameter ratios) enable optimum transfer of load from matrix to fibers, surface finish, fiber-to-matrix adhesion, and different fiber loading percentages to be achieved in the finished molded composite fasteners.

As those of skill in the art will appreciate, care must be taken during the mold filling operation so that the fibrous insert does not allow for large scale movement (in the relative dimensions of the fastener) of the fibers during the filling of the mold. Substantial movement of fibers may enable fiber-deficient areas (i.e., areas that are rich in matrix polymer) to be formed in the fastener.

Figure 1:
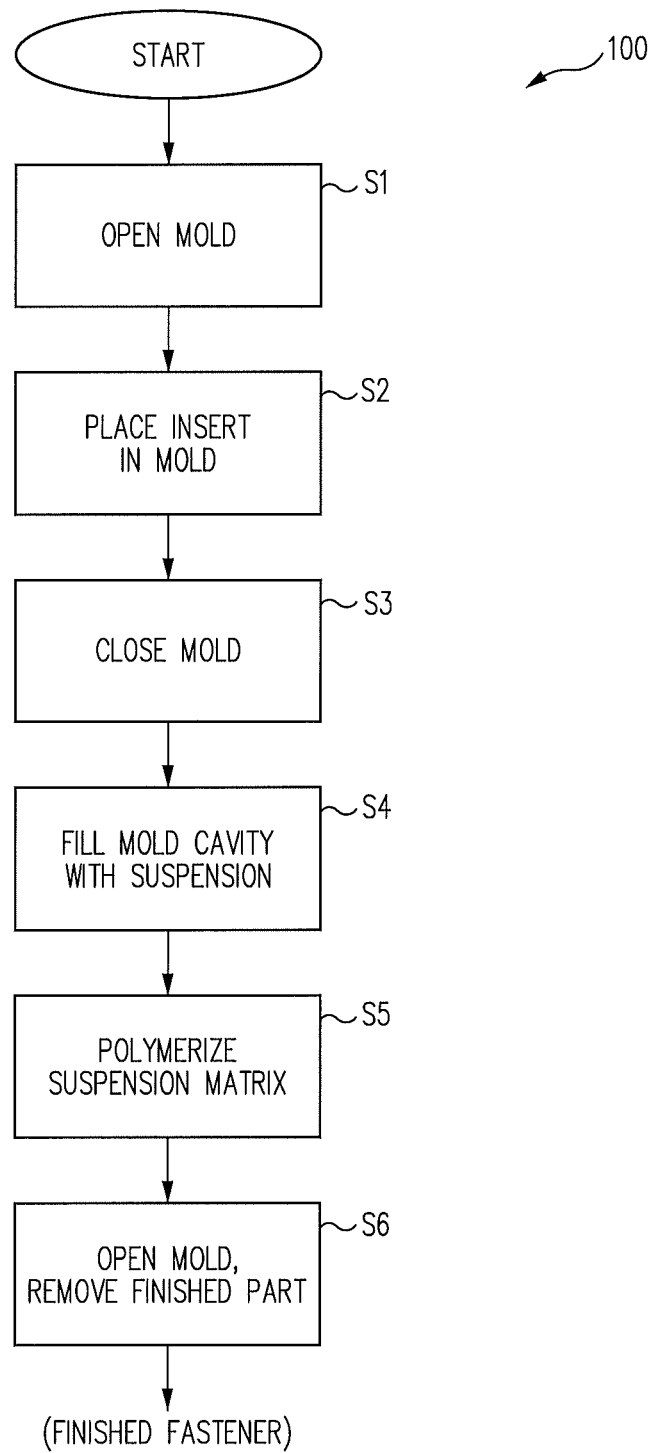
FIG. 1 is a process flow diagram of an exemplary embodiment of a method for manufacturing composite fasteners in accordance with the present disclosure.
Figure 2:
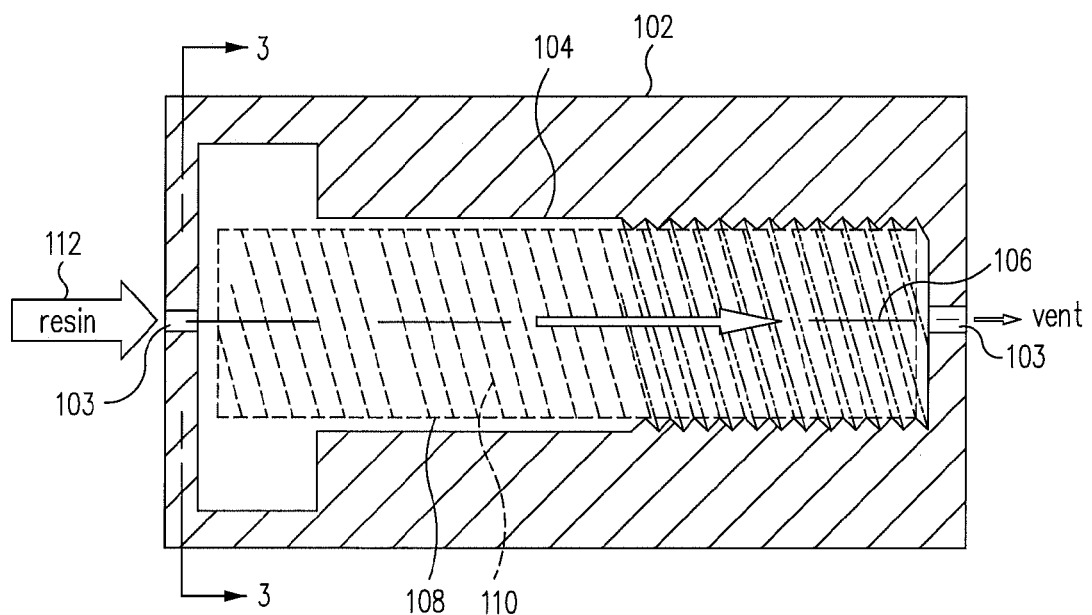
FIG. 2 is a cross-sectional view of a mold used in the method, showing an exemplary embodiment of a fastener in accordance with the present disclosure being molded therein.
Figure 3:
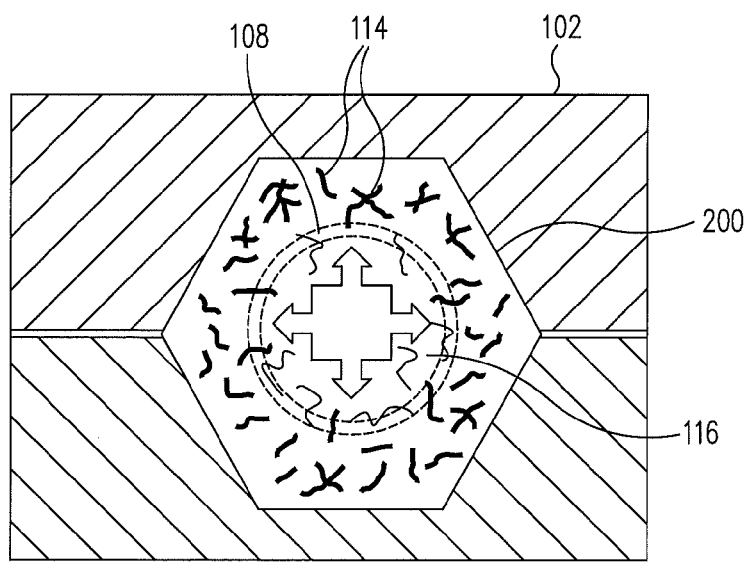
FIG. 3 is a cross-sectional view of the exemplary mold and fastener of FIG. 2, as seen along the lines of the section 3-3 taken therein.

FIG. 1 is a process flow diagram of an exemplary embodiment of a method 100 for manufacturing composite fasteners in accordance with the present disclosure, FIG. 2 is a cross-sectional view of a mold 102 used in the exemplary method, showing an exemplary embodiment of a fastener 200 being molded therein, and FIG. 3 is a cross-sectional view of the exemplary mold 102 and fastener 200 of FIG. 2, as seen along the lines of the section 3-3 taken therein.

Figure 4:
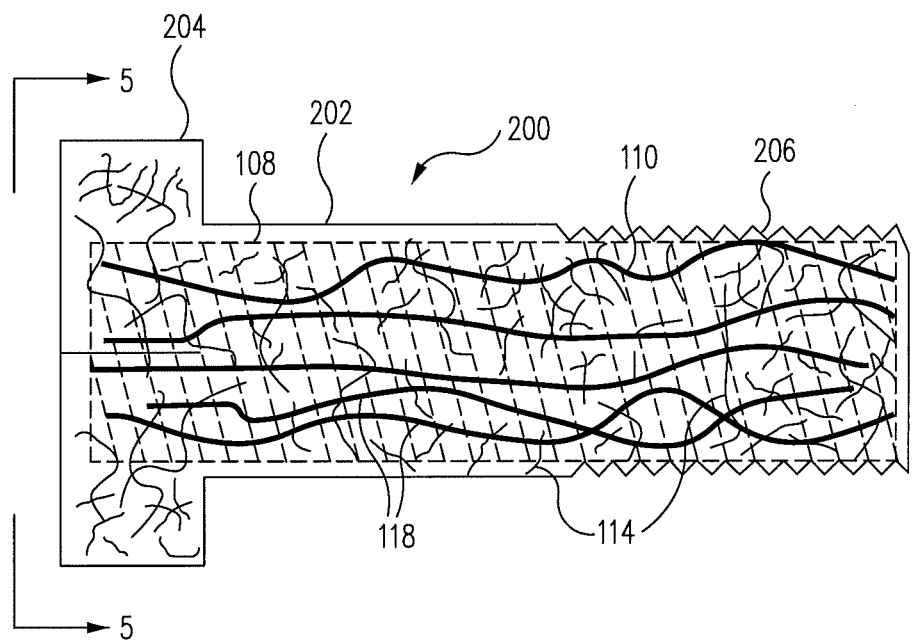
FIG. 4 is a cross-sectional view of the exemplary fastener of FIG. 2.
Figure 5:
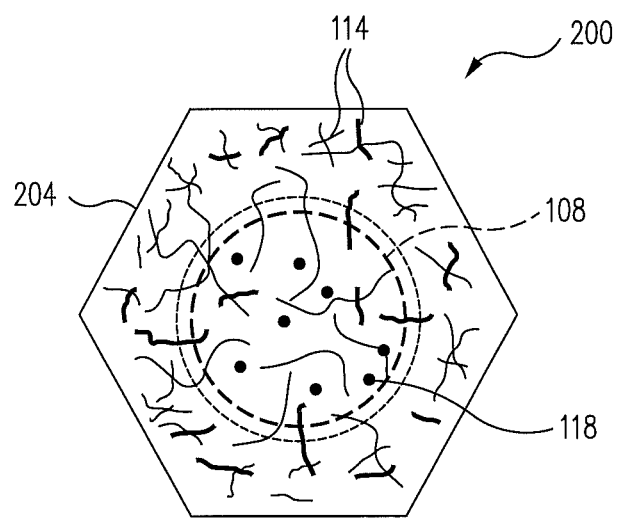
FIG. 5 is a cross-sectional view of the exemplary fastener of FIG. 4, as seen along the lines of the section 5-5 taken therein.

FIG. 4 is a cross-sectional view of the exemplary fastener of FIG. 2 after molding, and FIG. 5 is a cross-sectional view of the exemplary fastener of FIG. 4, as seen along the lines of the section 5-5 taken therein.

Referring to FIGS. 1 and 2, the exemplary method 100 includes the initial provision of: 1) a mold 102 containing an elongated cavity 104 having a long axis 106 and a shape corresponding to that of a fastener 200 that is to be molded therein; 2) an elongated insert 108 comprising a plurality of interwoven or intermingled first reinforcing fibers 110 having a length about the same as the length of the cavity 104; and, 3) a liquid "suspension" 112, comprising a liquid, polymerizable or otherwise hardenable matrix in which a plurality of second reinforcing fibers 114 are suspended, the second reinforcing fibers having a length that is substantially less than the length of the first reinforcing fibers 110.

With reference to FIG. 1, the exemplary method 200 begins at S1 with the opening of the mold 102 so as to receive the insert, followed at S2 by the placement of the insert 108 in the cavity 104 of the mold such that the relatively long first reinforcing fibers 110 are disposed generally parallel to the long axis of the cavity and potentially filling the detailed threaded portion of the mold. Then, at S3, the mold 102 is closed over the insert, and at S4, the cavity 104 of the mold is filled with the liquid suspension 112, in the direction of the arrow shown in FIG. 2, such that the relatively short second reinforcing fibers 114 are distributed generally uniformly throughout the mold cavity and completely envelop the fibers of the insert 108. After the mold cavity has been completely filled with the liquid suspension 112, at S5, the liquid matrix of the suspension is hardened, e.g., polymerized or cooled in the mold, which, as discussed below, may be effected in a variety of ways, so as to form a hardened polymeric fastener body that completely encapsulates the insert 108 and reinforcing fibers 110 and 114. At S6, the mold is opened and the molded fastener 200 is then removed from the mold for use or further processing, if required.

The mold 102 may be made of a variety of suitable materials, e.g., steel, or alternatively, of a material that is "transparent" or conductive to some form of electromagnetic radiation, e.g., heat, ultraviolet (UV) light or magnetic fields, so as to enable the polymerization process described below to be effected via radiation of a liquid monomer or polymer therewith. The mold may include suitable gates, sprues and vent openings 103 adapted for the ingress of liquids into the mold cavity 104 and the escape of air and gasses therefrom during the molding process. The surface of the mold cavity may be coated with a suitable mold release material.

Alternatively, the resinous matrix material can be injected into the cavity by means of a "air displacement" technique in which a nozzle (not illustrated) is initially positioned at a first end of the fastener cavity 104 and then withdrawn toward the opposite, second end of the cavity while the liquid suspension 112 is simultaneously injected through it into the cavity under such pressure that, as the nozzle is withdrawn, the fibrous insert 108 is deformed radially into the threaded portion of the mold and the gas within the cavity is expelled at the second end of the cavity so as to ensure that no gas pockets are entrapped within the resin or reinforcing fibers. In one embodiment, this latter filling process can result in a fiber-free core of resin that resides along the path taken by the nozzle during the filling or injection operation.

Additionally, as will appreciated by those skilled in the art, although the methods described herein are discussed in the context of the manufacture of a single fastener, they are also amenable to the simultaneous molding of a plurality of fasteners 200, which may be identical to or different from each other, and accordingly, the mold 102 may incorporate a corresponding plurality of identical or dissimilar cavities 104 therein.

In the particular exemplary embodiment illustrated in FIGS. 2 and 3, the insert 108 comprises an annular sleeve of the longer, first reinforcing fibers 110, which has a axial lumen 116 extending through it. In one embodiment of the method, the filling of the mold cavity 104 with the liquid suspension 112 may comprise infiltrating the lumen of the annular sleeve with the liquid suspension such that the annular wall of the sleeve is expanded radially outward toward the walls of the mold cavity by the pressure exerted on it by the pressure of the liquid suspension, as illustrated schematically in FIG. 3.

In another possible embodiment, the insert 108 may further include a loosely interwoven or intermingled bundle of third reinforcing fibers 118, which have a length about the same as that of the annular sleeve, and which are axially disposed within the lumen 116 of the sleeve before the insert is placed in the cavity 104 of the mold 102, as illustrated in the cross-sectional views of the resulting insert 200 of FIGS. 4 and 5. In this embodiment, the cavity is preferably filled with the liquid suspension 112 in such a way that the annular sleeve is expanded radially outward and the suspension penetrates into the interstices of the bundle of third reinforcing fibers 118 so as to fully encapsulate them.

In yet another exemplary embodiment, the annular sleeve may be omitted, and the insert 108 may comprise simply a cylindrical bundle of the first reinforcing fibers 110 that are loosely interwoven or intermingled with each other, as in the previous embodiment. However, in all of the above exemplary embodiments, it is desirable that the liquid 112 possibly containing the shorter second reinforcing fibers 114 be introduced into the cavity 104 of the mold 102 in such a way that the shorter second reinforcing fibers are distributed generally uniformly throughout the mold cavity and intermingled with the longer fibers of the fibrous insert 108, including within the interstices thereof, and such that the liquid matrix completely wets the respective surfaces of each of the fibers 110, 114 and 116. To this end, it may be desirable in some instances to pre-coat all reinforcing fibers with, e.g., a binder to hold them in place, or with a coating that enhances their wetting with the liquid matrix, or a pre-reacted (e.g., a "B-stage") liquid matrix coating at the beginning of the mold filling operation.

The reinforcing fibers 110, 114 and/or 116 of the fasteners may comprise a wide variety of material types, including glass, carbon, boron, boron nitride (BN), beta carbon nitride (CN) or aluminum oxide ($Al_2O_3$), and further, may selectively comprise electrically conductive and/or non-conductive fibers, depending on the particular application of the fasteners.

In the exemplary embodiments disclosed herein, the liquid matrix of the suspension 112 may comprise either a monomer or a polymer that is capable of being at least partially polymerized, and optionally, of also being at least partially cross-linked, while it is disposed in the cavity 104 of the mold 102.

The matrix may thus comprise a thermosetting resin, such as found in epoxy, polyimide, or polyacrylic, polyurethane, or alternatively, a thermoplastic resin, such as polyetherketone (PEK), polyetheretherketone (PEEK), polyetherketoneketone (PEKK), polyacrylic, polyetherimide, polycarbonate or a polyamide.

The liquid suspension 112 may be introduced into the cavity 104 of the mold using a variety of know methods, including high-pressure injection molding (IM) techniques and low-temperature, low pressure resin transfer molding (RTM) techniques.

In one possible alternative embodiment, the liquid matrix may comprise water, which is used as a low viscosity vehicle to introduce the short second reinforcing fibers 114 into the cavity 104 of the mold 102 initially, and which is then subsequently displaced with a hydrophilic polymerizable liquid monomer or polymer before the hardening of the liquid matrix.

In yet another alternative embodiment, the liquid matrix of the suspension 212 may comprise a low-viscosity liquid hydrocarbon, such as a ketone or an alcohol, which, like the water above, can be used to introduce the short second reinforcing fibers 114 into the mold cavity 104 initially, and which is then displaced by a lipophilic polymerizable liquid monomer or polymer before the polymerization of the liquid matrix.

The hardening, or polymerizing, of the liquid matrix of the suspension 112 may comprise a wide variety of processes, depending on the particular choice of materials, such as heating the liquid matrix, irradiating the liquid matrix with radiation, such as the UV radiation process discussed above, oxidizing the liquid matrix, by mixing a catalyst with the liquid matrix prior to its introduction into the cavity 104 of the mold 102, or by the mixing of a multi-component system just prior to or simultaneous with the filling of the mold cavity. Also, as discussed above, and depending upon the matrix material selected, the polymerizing of the liquid matrix may additionally comprise cross-linking of the matrix for additional strength and hardness.

In one possible alternative embodiment, the matrix of the liquid suspension may be hardened, or "cured," to a first hardness, sometimes referred to as a "B-stage" hardness, that is less than a final hardness, and then subsequently hardened to a final, greater hardness in a later step. This two-stage hardening process may be used advantageously where it is desirable to effect additional processing of the fastener after it is molded, but before it is cured to its final hardness. For example, the hardening of the suspension matrix to the first hardness may be effected in the cavity 104 of the mold 102 to form a fastener without threads. The fastener can then be easily threaded after it is removed from the mold by simply rolling the threads into the surface of the relatively soft, B-stage shank of the fastener with a suitable thread-rolling tool, after which the matrix can then be treated for development of a greater final strength and hardness and an improved surface finish.

In a similar manner, a composite rivet having a single head can be molded to a B-stage hardness in a suitable mold, held in the B-stage condition for an extended period of time, then subsequently cured to a final hardness after its installation and the formation of a second head thereon.

An exemplary composite fastener 200 made in accordance with the methods of the pre-sent disclosure is illustrated in the cross-sectional views of FIGS. 4 and 5. As illustrated therein, the exemplary fastener comprises a molded polymer body having an elongated shank portion 202 and a radially enlarged head portion 204 disposed concentrically on the shank portion at one end thereof.

In the particular exemplary embodiment illustrated, the fastener 200 includes an elongated fibrous insert 108 encapsulated within the fastener body and extending between the opposite ends thereof. As described above, the insert comprises a plurality of relatively long first reinforcing fibers 110 interwoven or intermingled to form an annular sleeve that has a length about the same as that of the fastener body, and a loosely interwoven or intermingled cylindrical bundle of third reinforcing fibers 118, which have a length about the same as that of the sleeve, and which are disposed axially in the lumen of the sleeve. The body of the fastener also incorporates a plurality of the shorter, second reinforcing fibers 114 encapsulated therein and distributed generally uniformly throughout the fastener body.

In the particular embodiment illustrated, the shank portion 202 comprises a helical thread 206 that is molded onto an outer surface of the shank. However, as discussed above, the thread may also be formed after the fastener 200 is molded, and as discussed above, the exemplary method is also capable of manufacturing threadless fasteners, such as rivets. The thread form can be any standard or non-standard threadform dependant on the application of the fastener. The threads may extend the length of the fastener shank or any portion thereof. It should be noted that molds or inserts having larger threadforms and/or lacking angular geometries will be more amenable for precision placement of reinforcement fibers. The insert threadform need not necessarily correspond to that of the final molded fastener.

As illustrated in FIG. 5, the head portion 204 of the composite fastener 200 may incorporate a polygonal cross-section in a plane transverse to a long axis of the fastener, e.g., a conventional hexagonal head adapted for engagement by a tool, such as a socket wrench, or alternatively, the head portion may be formed with any geometrical cross-section. The head portion may also easily be molded to include a variety of other features adapted to be engaged by a tool, such as a driver, e.g., a slot or a Phillips recess (not illustrated).

The composite fasteners of the present disclosure differ from existing solutions in that either or both of electrically non-conductive or conductive reinforcing fibers may be incorporated therein (i.e., their materials may be tailored to the particular application at hand), they can eliminate the possibility of electrical conduction between the bonded substrates, and the system can be tailored to have a non-uniform strength and/or electrical conduction longitudinally or radially, provide easier formability, and enable cost reductions to be achieved as a result of the requirement for less complex forming machinery (e.g., fewer heating elements). If desired, the composite fasteners enable variable strength to be achieved along the length of the fastener, and tailoring of the content of fibers and fiber types in the finished product enables more tailorable conduction and infiltration of matrix material of the proper composition to areas where it is needed most—for most fasteners, this is most critical in threaded portions of the fastener.

As a specific example of how the preceding considerations may be physically manifested in fastener designs emanating from this concept, a fastener can be fabricated with an electrically insulative material comprising the outermost portion of the 'sleeved' insert with conductive fibers on the interior of the fastener. This would provide a means for achieving a radially non-uniform, electrical conductivity within the fastener. For an axial, or longitudinal non-uniformity, it may be envisaged that the composition of fibers transitions from an electrically conductive, carbon fiber-rich volume at the base of the fastener to an insulative glass fiber rich 'head' end. This "graded property" insert is also applicable to any physical property that may be desired to be changed along the length or radius of the fastener. Strength may be modified by incorporation of variable fiber strengths (materials) or fiber lengths in a similar fashion. Variation in fiber composition and density of loading may also be envisaged, resulting in a variation of properties. There may be placed within the insert a region of low fiber density that may act as a 'shear' load limiting mechanism of the fastener. This may be a design feature adapted to avoid damage to the substrates to be bound together by 'overtorquing' the fastener during installation.

Thus, the fastener system described may incorporate an insert that has a non-uniform material composition, either radially or longitudinally. The core of the fastener may be long fibers surrounded by a plethora of short fibers radiating from the central axis. The core may extend all the way to the outer radius of the fastener. The diameter of this core may be variable, depending on the properties desired in the fastener. The electrical properties of the overall fastener may thus be varied, dependant on the size of the core.

The novel composite fasteners of the present disclosure thus provide an advance over existing fastener solutions because they result in fasteners with lower weight, higher specific strength, can be made electrically non-conductive or contain variable conductivity either longitudinally or axially, and can incorporate optimum reinforcing fiber placement and orientation.

As those of skill in this art will appreciate, many modifications, substitutions and variations can be made in the materials, processes and implementations of the composite fasteners and methods for making them of the present invention without departing from its spirit and scope. In light of this, the scope of the present invention should not be limited to that of the particular embodiments illustrated and described herein, as they are only by way of examples thereof, but instead, should be fully commensurate with that of the claims appended hereafter and their functional equivalents.

What is claimed is:

1. A composite fastener, comprising:
    a molded polymer body comprising an elongated shank portion and a radially enlarged head portion disposed concentrically on one end of the shank portion;
    an elongated fibrous insert encapsulated within the fastener body and extending between opposite ends thereof, the insert comprising a plurality of interwoven first reinforcing fibers, each having a length about as long as the fastener body and distinct opposite ends respectively spaced inwardly from the corresponding opposite ends thereof; and,
    a plurality of second reinforcing fibers encapsulated within the fastener body, the second reinforcing fibers having a length substantially less than the length of the first reinforcing fibers and being distributed generally uniformly throughout the fastener body and intermingled with the longer fibers of the fibrous insert.

2. The composite fastener of claim 1, further comprising a helical thread disposed on an outer surface of at least a part of the shank portion.

3. The composite fastener of claim 1, wherein the head portion has a circular or a polygonal cross section transverse to a long axis of the fastener.

4. The composite fastener of claim 1, wherein the head portion includes a feature adapted to be engaged by a tool.

5. The composite fastener of claim 1, wherein at least one of the first and second reinforcing fibers comprises an electrically conductive fiber.

6. The composite fastener of claim 1, wherein at least one of the tensile strength and/or the shear strength of the fastener is variable along at least one of the length and/or the radius of the fastener.

7. The composite fastener of claim 1, wherein thermal conductivity of the fastener is variable along the length or radially.

8. The composite fastener of claim 1, wherein the electrical conductivity of the fastener is variable along the length or radially.

9. A method for manufacturing the composite fastener of claim 1, the method comprising:
    providing a mold containing an elongated cavity having a long axis and the shape of a fastener to be molded therein;
    providing an elongated insert comprised of a plurality of interwoven first reinforcing fibers having a length about as long as the cavity and distinct opposite ends;
    providing an uncured liquid suspension comprising a liquid matrix in which a plurality of
    second reinforcing fibers are suspended, the second reinforcing fibers having a length substantially less than the length of the first reinforcing fibers;
    opening the mold;
    placing the insert in the cavity such that the first reinforcing fibers are disposed generally parallel to the long axis of the cavity and their distinct opposite ends are respectively spaced inwardly from corresponding opposite ends of the cavity;
    closing the mold;
    filling the cavity of the mold with the suspension such that the second reinforcing fibers are distributed generally uniformly throughout the cavity and the opposite ends of the first reinforcing fibers remain respectively spaced inwardly from the corresponding opposite ends of the cavity;
    hardening the liquid matrix of the suspension in the mold so as to form a hardened fastener body completely encapsulating the first and second reinforcing fibers therein;
    opening the mold; and,
    removing the molded fastener from the mold.

10. The method of claim 9, wherein the insert comprises an annular sleeve having an axial lumen, and wherein the filling of the cavity with the liquid suspension comprises infiltrating the lumen of the sleeve with the liquid suspension such that the sleeve is expanded radially toward the wall of the mold cavity by the pressure of the liquid suspension.

11. The method of claim 10, wherein the insert further comprises a plurality of third reinforcing fibers disposed axially in the lumen of the sleeve, the third reinforcing fibers having a length about as long as the sleeve.

12. The method of claim 9, wherein the insert comprises a cylindrical bundle of the first reinforcing fibers.

13. The method of claim 9, wherein at least one of the first and second reinforcing fibers comprises glass, carbon, boron, boron nitride (BN), beta carbon nitride (CN) or aluminum oxide ($Al_2O_3$).

14. The method of claim 9, wherein the liquid matrix comprises a thermosetting resin or a thermoplastic resin.

15. The method of claim 14, wherein the thermosetting resin comprises epoxy, polyimide, polyacrylic, polyamides or a cross linkable resin.

16. The method of claim 14, wherein the thermoplastic resin comprises a thermoplastic resin, polyetherketone (PEK), polyetheretherketone (PEEK), polyetherketoneketone (PEKK), polyetherimide, polyimide, polycarbonate, polyester, polysulfone, polyU-rethane or a polyamide.

17. The method of claim 9, wherein the liquid matrix comprises water, and further comprising displacing the water with a hydrophilic, polymerizable liquid monomer or polymer before the hardening of the liquid matrix.

18. The method of claim 9, wherein the liquid matrix comprises a liquid hydrocarbon, and further comprising displacing the liquid hydrocarbon with a lipophilic polymerizable liquid monomer or polymer before the hardening of the liquid matrix.

19. The method of claim 9, wherein the hardening of the liquid matrix comprises:
hardening the matrix to a first hardness that is less than a final hardness; and,
then hardening the matrix to the final hardness.

20. The method of claim 19, wherein the hardening of the matrix to the first hardness is effected in the cavity of the mold and the hardening of the matrix to the final hardness is effected after the fastener is removed from the mold.

21. The method of claim 9, wherein the hardening of the liquid matrix comprises cross-linking the molecules of the liquid matrix.

22. The method of claim 9, wherein the hardening of the liquid matrix comprises heating the liquid matrix, irradiating the liquid matrix with radiation, oxidizing the liquid matrix, mixing a catalyst with the liquid matrix, injecting a multipart polymerizable liquid matrix through different ports of the mold, or mixing components of the liquid matrix before filling the mold with the liquid matrix.

23. The method of claim 9, wherein the filling comprises:
positioning an end of a nozzle at a first end of the cavity; and,
injecting the liquid suspension through the nozzle and into the cavity while simultaneously withdrawing the nozzle from the cavity such that any gas present within the cavity is expelled at a second end of the cavity and no gas pockets are entrapped within the liquid suspension.

* * * * *